Feb. 16, 1965 E. A. G. HENNEQUIN 3,169,513
DEVICE FOR REGULATING THE SUPPLY OF FUEL INJECTED
INTO AN INTERNAL COMBUSTION ENGINE
Filed May 7, 1963 3 Sheets-Sheet 1
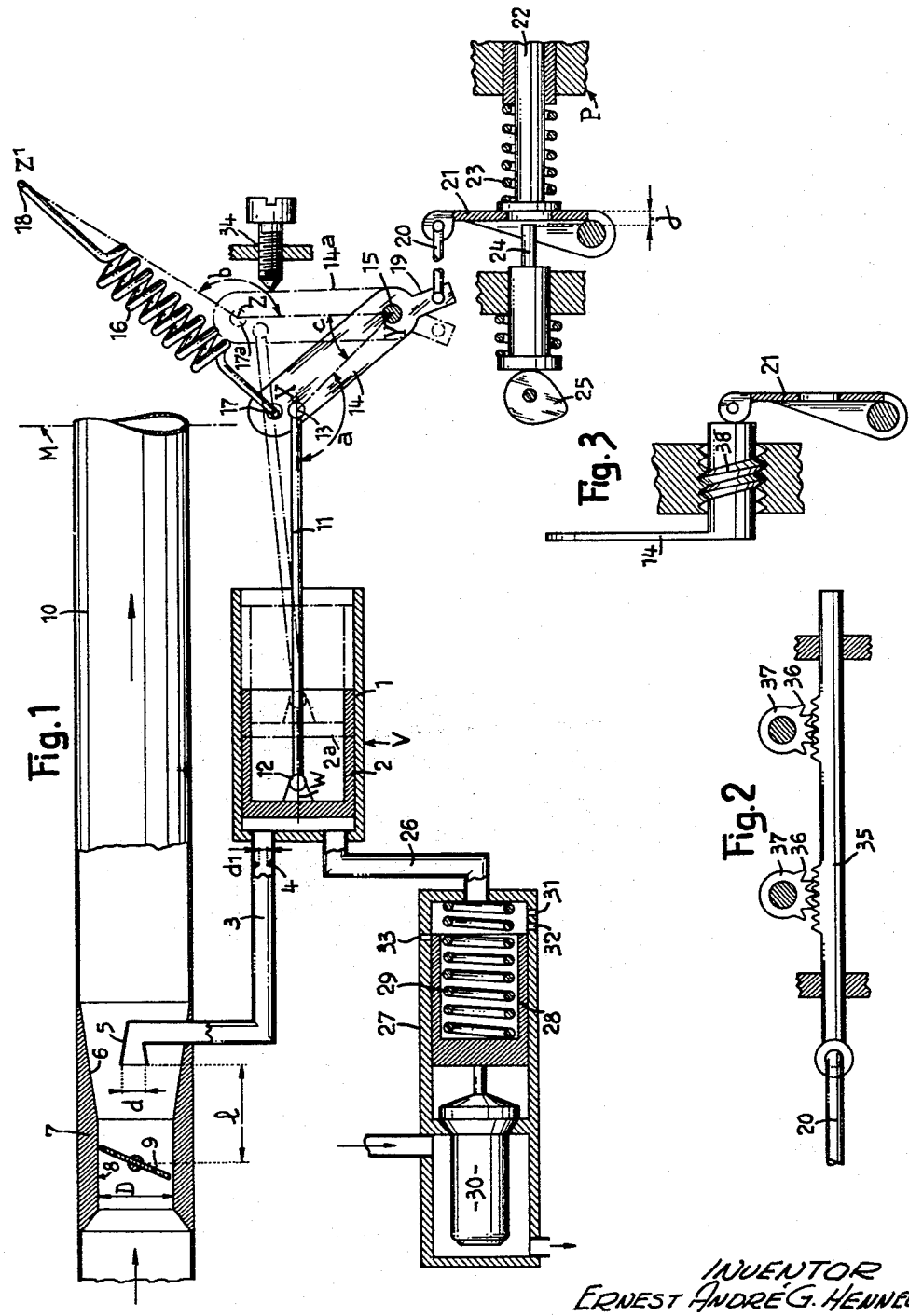
INVENTOR
ERNEST ANDRÉ G. HENNEQUIN
BY LeBlanc & Shur
ATTORNEYS

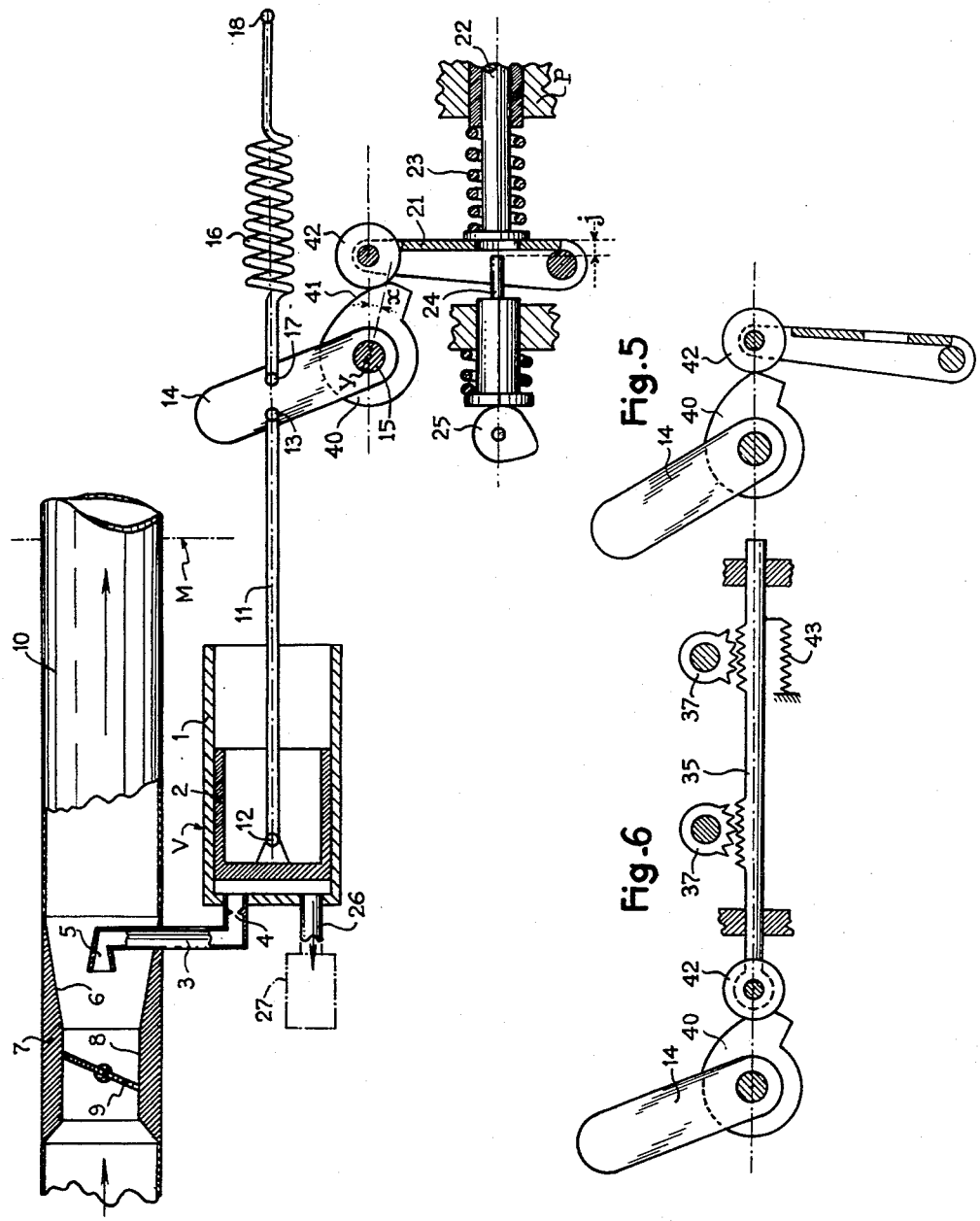

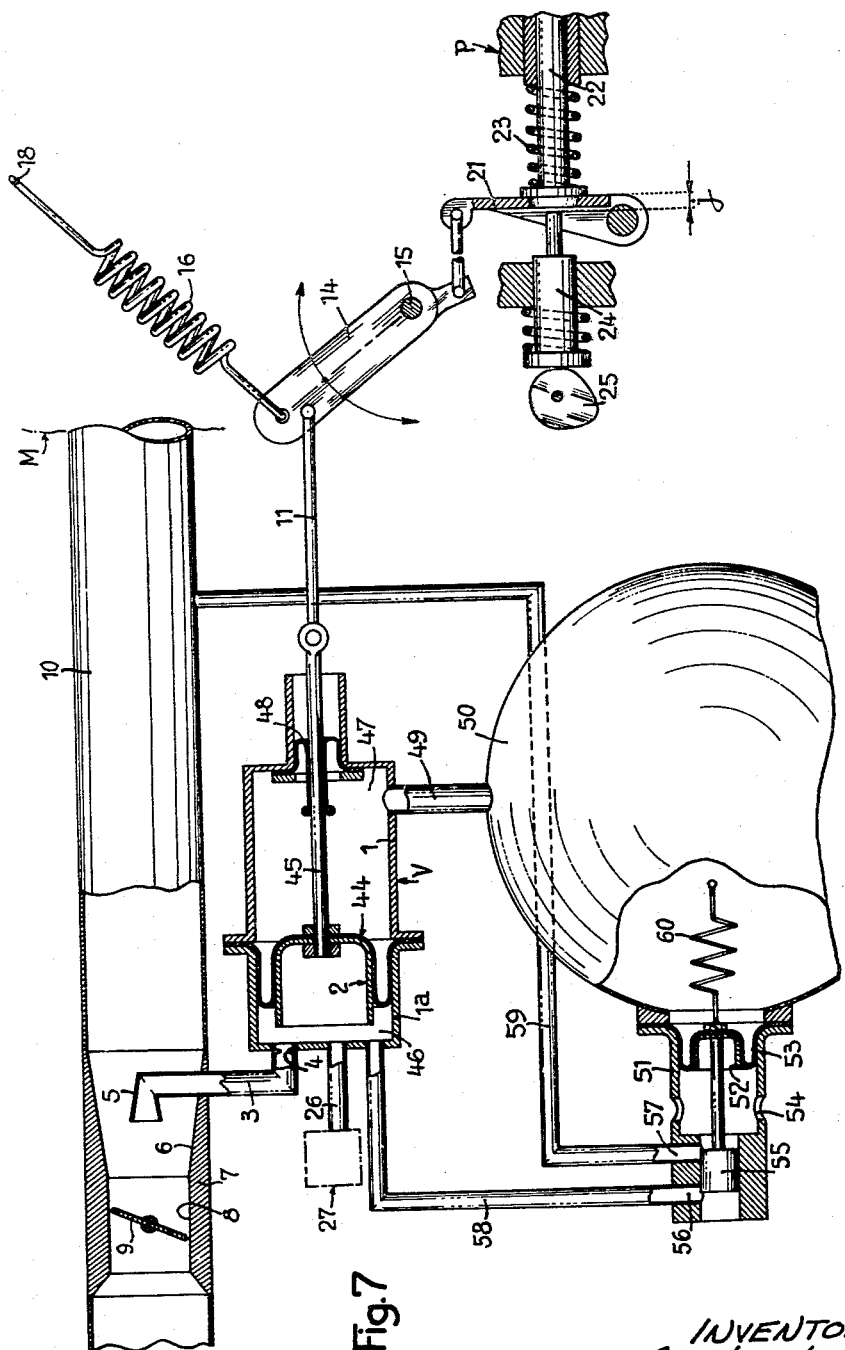

United States Patent Office 3,169,513
Patented Feb. 16, 1965

3,169,513
DEVICE FOR REGULATING THE SUPPLY OF FUEL INJECTED INTO AN INTERNAL COMBUSTION ENGINE
Ernest André Gaston Hennequin, Montbeliard, France, assignor to Societe d'Etudes et d'Applications Industrielles et Immobilieres "Inter-Technique," Paris, France, a French body corporate
Filed May 7, 1963, Ser. No. 278,561
Claims priority, application France, May 10, 1962, 897,101; Sept. 18, 1962, 909,739; Nov. 29, 1962, 916,989
13 Claims. (Cl. 123—140)

The present invention relates to the supply of fuel to an internal combustion engine of the explosion type through the agency of an injection pump of the volumetric type and more particularly to fuel metering devices.

Many known devices utilize the negative pressure prevailing in the induction pipes of the explosion engine for the purpose of actuating, in combination with a corrector subjected to the action of a centrifugal governor driven by the engine, regulating means which meter the amounts of fuel injected in such manner as to obtain an air/gasoline mixture having a constant ratio for all engine speeds and loads.

The object of the invention is to provide a much simpler regulating device which permits obtaining the aforementioned constant ratio in utilizing only the action of the vacuum or negative pressure that prevails in the induction pipes on the downstream side of the throttle controlling the supply of air to the engine. This is achieved owing to the fact that the output regulating means of the pump is connected to the moving element of an expansible chamber device whose variable-volume chamber is connected via a jet to a negative pressure inlet disposed on the downstream side of the throat of a Venturi through which the induction air flows to the engine, this inlet opening out in a divergent manner in front of said throat, that is, in front of the stream of air travelling through the Venturi, the arrangement being such that any increase in the vacuum in the inlet results in a decrease in the output of the pump in opposition to the action of an elastically yieldable return device.

According to another feature of the invention, the variable volume chamber of the expansible chamber device is put in communication with the atmosphere by an obturator subjected to the opposing actions of a spring and a thermostat responsive to the temperature of the engine, the arrangement being such that the action of the negative pressure inlet is cancelled out by putting said chamber in communication with the atmosphere when the engine is cold.

Consequently, there is obtained as soon as the engine starts up:

(a) When cold: a vaporized mixture rich in gasoline, the richness of which decreases as the engine heats up.

(b) When warm: a rich vaporized mixture during the first few revolutions of the engine, after which the mixture is normal.

(c) In normal engine operation: a vaporized mixture whose air/gasoline ratio by weight is substantially constant irrespective of engine load and speed.

Further features and advantages of the invention will be apparent from the ensuing description, with reference to the accompanying drawings to which the invention is in no way limited.

In the drawings:

FIG. 1 is a diagrammatic sectional view of a regulating device according to the invention;

FIGS. 2 and 3 are partial detail views of two variants;

FIG. 4 is a partial diagrammatic sectional view of another regulating device utilizing a cam improved in accordance with the invention;

FIG. 5 is a view of a second position of the cam and lever associated with the latter;

FIG. 6 is an elevational view, partly in section, of a variant in which the cam acts on a rod constituting a rack, and FIG. 7 is a diagrammatic view partly in section, of another regulating device according to the invention.

In the embodiment shown in FIG. 1, the device comprises an expansible chamber device V having a cylinder 1 and a piston 2. The cylinder 1 is connected by a pipe 3, containing a jet 4, to a negative pressure inlet 5 which is located in the divergent part 6, and on the longitudinal axis, of a Venturi 7 whose throat 8 contains the throttle 9 controlling the entry of air into the induction pipes of the engine M. The depression on negative pressure inlet 5 is open and divergent in the upstream direction, that is, in the direction of the throttle of the Venturi 7.

The piston 2 of the device V is connected by a link 11, pivoted at 12 and 13, to a lever 14 which is pivotable about a fixed pivot pin 15. A spring 16 is attached at 17 to the lever 14 and to a fixed point 18. This spring balances at each instant the force exerted by the device V.

The lever 14 comprises a depending portion 19 connected by a link 20 to the device varying the volume of fuel injected by the volumetric pump utilized. In the presently-described embodiment, this link 20 is connected to the lever 21 of a pump P whose output or delivery is varied by varying the travel of the piston 22. The lever 21 acts as a return abutment for the piston 22 biased by a spring 23 and permits, in accordance with its position, regulating the clearance j which exists between the piston 22 and a push-rod 24 actuated by a cam 25 driving the pump P.

Further, the expansible chamber device V is connected by a pipe 26 to a cylinder 27 in which is slidable a slide 28. A spring 29 urges this slide against the expansible part of a thermostat element 30. Ports 31, 32 and 33 formed in the cylinder 27 allow, when they are not obturated by the slide 28, air to enter the device V and consequently the induction piping 10 of the engine.

An adjustable stop 34 determines the extreme position 14ª of the return travel of the lever 14 under the action of the spring 16.

The regulating device just described operates in the following manner:

(A) STARTING UP AND IDLING

At rest, the throttle 9 controlling the entry of air into the engine is closed; the spring 16 holds the lever 14 in the extreme position 14ª and the piston of the expansible chamber device V is in the position 2ª shown in dot-dash line. In this position the variable clearance j is very small since the lever 14 has shifted the lever 21 to the left position (not shown). The injection pump P is therefore in the maximum output or full-throttle position. When starting up, that is, when the engine M is driven by the starter, the first injections are therefore very rich; as soon as the engine runs under its own power the vacuum increases and consequently the device V returns the lever 14 and the lever 21 to the positions shown in full line in FIG. 1, the variable clearance j increases and the volume of injected gasoline decreases.

Let two cases be considered.

*1st case.—The engine is cold*

The thermostat element 30 inserted in the water circuit of the engine has contracted, the slide 28 has uncovered the ports 31 and 32 (it could also uncover the port 33 if intensely cold conditions prevail) and the air entering through these ports produces, on the one hand, a drop in the vacuum within the device V so that the latter does not shift the lever 14 completely toward the left and consequently volumes of fuel are injected which are larger than those provided for under normal idling conditions; and, on the other hand, an increase in the amount of air absorbed by the engine M, which increases the idling speed.

There is thus obtained an accelerated idling condition rich in gasoline.

*2nd case.—The engine is warm*

In this case the thermostat element 30 has expanded, the ports 31, 32 and 33 are obturated, the device V no longer communicates with atmospheric pressure and the idling conditions are normal.

(B) OPERATION UNDER LOAD

As soon as the throttle 9 controlling the admission of air is open the negative pressure (vacuum) in the induction piping drops and the force exerted by the device V decreases. The spring 16 shifts the lever 14 toward the right, the variable clearance $j$ is reduced and there is an increase in the volume of injected fuel. When the throttle is fully open the vacuum in the induction piping is in the neighbourhood of zero, the piston 2 of the device V and the lever 14 are in the positions $2^a$ and $14^a$ shown in dot-dash line and the volume of injected fuel is maximum.

The negative pressure inlet 5 is directed in such manner as to receive the dynamic pressure of the air entering the engine. Now, this pressure is lower at low engine speeds than at high speeds. It is this arrangement which permits dispensing with the usual centrifugal governor driven by the engine.

A kinematic study and trials carried out have revealed that for the regulating device to give automatically a $$\frac{\text{weight of air}}{\text{weight of gasoline}}$$

ratio that is constant with the use of any known volumetric pump P, the following conditions must be satisfied:

The angle $a$ between the axis W–X of the link 11 intersecting the pivot points 12 and 13 and the radius X–Y of the lever 14 intersecting the pivot points 13 and 15 must be between 120° and 150° when the engine M is running in the warmed up condition at its normal idling speed.

The angle $b$ between the radius Y–Z of the lever 14 intersecting the pivot points 15 and $17^a$ and the axis Z–$Z^1$ of the spring 16 intersecting the points $17^a$ and 18 must be between 120° and 180° when the engine M is not running.

The angle $c$, representing the total angular travel of the lever 14, must be less than 80°.

The pivot point 13 of the link 11 and the point 17 of attachment of the spring 16 on the lever 14 can be located on the same radius or otherwise and at more or less great distances from the pivot centre 15; they can also be coincident; the force exerted by the spring 16 on the lever 14 must exactly balance the force exerted by the expansible chamber device V when the engine is running; its force is practically zero when the engine operates under full load and is maximum when the engine is idling.

To obtain the correction of the flow as a function of the speed of the engine, the negative pressure inlet 5 which receives the dynamic pressure of the air must satisfy the following conditions:

If C is the cylinder capacity of the engine expressed in cubic centimetres, the diameter D of the throat of the conventional Venturi being $$D=\sqrt{\frac{C}{8}}$$

The negative pressure inlet is located at a distance $l$ from the throttle controlling the air admission so that $l=1.15\ D$ and the diameter $d$ of the entrance of the inlet is such that $$d=\frac{D}{3.75}$$

The diameter $d_1$ of the jet 4 is equal to $$\sqrt{\frac{C}{4500}}$$

And the total sectional area of the ports 31, 32, 33 controlled by the thermostatic element 30 is at the most equal to the sectional area of the jet 4.

In the variant shown in FIG. 2, the link 20 is connected to a rack 35 which is meshed with sectors 36 of the pistons 37 of the pump and rotates these pistons about themselves so as to vary the output or delivery of the pump in the known manner.

In the variant shown in FIG. 3, the angular movement of the lever 14 is converted into a rectilinear movement by means of a screwthread 38 (or a helical ramp). In this case the end of the screw 38 bears either against the end of the lever 21 (see first embodiment) or against the end of the rack 35 (see FIG. 2).

In the first embodiment, the connection between the regulating means regulating the output of the pump and the movable element of the jack is, as explained, insured by a link and crank device. FIGS. 4–6 show other connections comprising a cam whose predetermined profile provides the desired law of variation in the output of the pump as a function of the negative pressure (vacuum) within the negative pressure inlet.

The cam solution is a little simpler than the crank solution but above all, owing to the profile of the cam, it permits exactly obtaining the desired law of variation in the output of the pump as a function of the negative pressure (vacuum), that is, the running speed of the engine.

In the embodiment shown in FIGS. 4 and 5, elements identical to the elements of the first embodiment carry similar reference characters.

The device comprises a cam 40 which is keyed on the journal 15 and whose profile 41 is so designed as to provide exactly the desired law of variation in the output of the pump as a function of the vacuum within the inlet 5, this cam rotating in the clockwise direction when the vacuum decreases. The position shown in FIG. 4 corresponds to an idling engine. It will be observed that the profile of the cam is extended beyond the point of contact corresponding to idling speed so as to permit, in respect of a vacuum greater than that of idling speed, an additional angular travel $x$ of the cam for the purpose explained hereinafter. The profile 41 of the cam cooperates with a roller 42 which is freely rotative on the end of a lever 21 varying the output of the pump P. It will be observed that the position of the spring 16 and its point of attachment that the displacement of the piston 2 of the expansible chamber device is roughly proportional to the extension of the spring 16. When the engine is idling the position of the roller 42 relative to the cam 41 is that shown in FIG. 4.

As soon as the speed of the engine increases, the vacuum decreases and the spring 16 progressively pivots the lever 14 and the cam 40 about the axis Y in the clockwise direction. The lever 21 therefore pivots in the opposite direction owing to the action of the cam 40 and the clearance $j$ decreases. Consequently, any variation in the vacuum—at any rate whenever the device 27 does not counter it, that is, when the engine is warm or is operating normally—therefore corresponds to a precise and predetermined pump output.

If the engine runs at high speed and the foot of the driver is suddenly lifted off the accelerator pedal, the engine is driven by the vehicle at a speed exceeding that of idling speed. In this case the vacuum prevailing in the induction piping 10 exceeds that corresponding to idling speed. This increase in the vacuum is utilized to rotate the cam through the angle $x$ and the latter is such that the displacement of the roller 42 is enough to cut off the injection of fuel, the cam 40 when assuming the position shown in FIG. 5 relative to the roller 42.

Briefly, the device gives the same results as that of the first embodiment but in addition it cuts off the injection of fuel when the foot is lifted off the accelerator pedal and the engine has a speed distinctly higher than that corresponding to the normal idling speed.

In the variant shown in FIG. 6, the roller 42 is mounted on the rack 35 which is similar to that shown in FIG. 2 and is meshed with sectors 37 which are rigid with pistons of a multipiston pump and permit rotating these pistons about themselves so as to vary the output of the pump in the known manner, the contact between the roller 42 and the cam 40 being maintained owing to the action of a spring, diagrammatically represented at 43.

The various devices which have just been described do not take into account that the negative pressure prevailing in the induction piping of the engine varies with, among other factors, the barometric pressure which itself varies as a function of altitude. Consequently, in these devices as atmospheric pressure decreases (for example when the vehicle travels in a mountainous region) the air/gasoline ratio decreases. In other words, the vaporized mixture becomes too rich in gasoline in proportions a little higher than when a carburator or a conventional regulating device is employed. Moreover, it is known that if the surrounding temperature increases, the vacuum prevailing in the induction piping of the engine decreases and the amount of gasoline increases and the air/gasoline mixture becomes too rich in gasoline.

The device shown in FIG. 7 remedies these drawbacks and is provided with an altimetric corrector with the result that if the atmospheric pressure changes the air/gasoline ratio does not change. Preferably, the corrector is furthermore a thermometric corrector, in that if the surrounding temperature changes the air/gasoline ratio does not change.

In this embodiment, the device comprises, as in the foregoing embodiments, a cylinder-and-piston air device V. The piston 2 defines in the cylinder 1, 1ª of the device V two chambers 46 and 47 which are rendered fluidtight by a membrane 44 which is secured to the piston 2 and between the two parts 1, 1ª of the cylinder of the device V and, as concerns the chamber 47, by another membrane 48 which connects the piston rod 45 to the bottom of the cylinder 1, these two membranes undergoing a rolling motion upon displacement of the piston.

The pipe 3 and the pipe 26 communicate with the interior of the chamber 46, the pipe 26 leading to a device 27 having a thermostat element which permits obtaining an accelerated idling condition rich in gasoline.

The chamber 47 is connected by a pipe 49 to a fluidtight spherical reservoir 50. The latter contains air whose pressure is equal to the atmospheric pressure of the region in which the carburation is regulated (760 mm. of mercury if this region is at sea level).

Secured to the reservoir 50 is a cylinder 51 in which is movable a piston 52. Fluidtightness between this piston and the cylinder is obtained by a membrane 53 which is connected to the piston 52 and to the reservoir 50, this membrane undergoing a rolling motion upon displacement of the piston. One of the sides of this membrane is subjected to the pressure prevailing in the reservoir and the other side is subjected to atmospheric pressure via apertures 54.

The piston 52 is connected to a slide 55 which is movable in front of ports 56 and 57. These two ports have the same diameter, the port 56 being connected by a pipe 58 to the chamber 46 of the device V, that is, to the side exposed to the negative pressure, whereas the port 57 is connected by a pipe 59 to the induction piping of the engine on the downstream side of the negative pressure inlet 5. A spring 60 biases the piston 52 toward the reservoir 50.

This device operates in the following manner:

Assuming that H is the pressure prevailing within the reservoir 50, nothing happens so long as the vehicle travels in an atmosphere having the same pressure H. The uncovered port 56 allows through sufficient air slightly to lower the vacuum in the expansible chamber device V. The port 57 is obturated.

On the other hand, when the vehicle travels in a mountainous region, the atmospheric pressure becomes $h$ which is lower than the pressure H within the fluidtight reservoir 50 and the vacuum in the device V has a tendency to drop. Owing to these two variations the pistons 2 and 52 move toward the left and the movement of the piston 2 decreases the volume of gasoline injected whereas the piston 52, in obturating to a variable extent the port 56 through the agency of the slide 55, increases the movement of the piston 2 toward the left and this still more decreases the volume of gasoline injected. In moving toward the left, the slide 55 uncovers the port 57 to a variable extent and this allows air to enter the engine. In short, the air, no longer entering the engine partly through the port 56, enters the engine through the port 57. The amount of air admitted into the engine does not vary and this maintains the idling speed.

It will be understood that for the pressure within the fluidtight reservoir 50 to remain substantially constant in operation, its suffices that the volume generated by the displacement of the membrane 44 be small relative to volume of this reservoir.

If the volume of the latter is 2000 cm.³ and the volume generated by the membrane 44 is 30 cm.³, there is obtained, assuming atmospheric pressure of 1 kg./cm.²:

$$2000 \times 1 = 2030 \times p$$
namely $p = 0$ kg. $985/$cm.²

$p$ represents the minimum pressure in the reservoir 50 when the engine is idling.

As concerns the thermometric correction it is sufficient to place the reservoir 50 in the circulation of the air feeding the engine. This simple arrangement provides a correction of richness as a function of the temperature since any variation in the latter is manifested by a variation in the pressure in the reservoir. If the temperature rises, the pressure rises and the corrector reacts in the direction for decreasing the injected fuel; the reverse occurs if the temperature drops.

Although specific embodiments of the invention have been described, many modifications and changes may be made therein without departing from the scope of the invention as defined in the appended claims.

Having now described my invention what I claim as new and desire to secure by Letters Patent is:

1. A device for regulating the supply of fuel injected into an internal combustion engine of the explosion type having an induction pipe and a Venturi disposed therein through which the induction air flows to the engine and a throttle controlling the entry of air through said Venturi, said device comprising: a volumetric injection pump having output regulating means; an expansible chamber device having a movable element connected to said output regulating means and a variable-volume chamber; a negative pressure inlet disposed in the induction pipe of the engine on the downstream side of the throat of the Venturi, said inlet consisting in a divergent nozzle opening out in front of said throat, that is in front of the stream of air travelling through said Venturi; connecting conduit means between said negative pressure inlet and said variable volume chamber; a calibrated jet arranged in said connecting conduit means; and an elastically yieldable device connected to said movable element of said expansible chamber device and to said output regulating means of said pump; the arrangement being such that any increase in the negative pressure in said negative pressure inlet results in a decrease in the output of the pump, in opposition to the action of said elastically yieldable return device.

2. A device as claimed in claim 1, further comprising an obturator biased in a closing direction by the suction of the variable-volume chamber to close at least partially ports connecting said variable volume chamber with the atmosphere, a spring means biasing said obturator in an opening direction, and a thermostat element responsive to the temperature of the engine and biasing said obturator in the closing direction when the engine is warm, said spring means and said thermostat element being so calibrated that, when the engine is cold, said obturator opens said ports through the differential effect of said spring means and the suction of said variable-volume chamber.

3. A device as claimed in claim 2, wherein said elastically yielding device comprises a lever mounted to pivot about a fixed pivot pin, one end of said lever being connected to said output regulating means, a link pivotally connected to said movable element of said expansible chamber device and to the other end of said lever, and a return spring having one end connected to a fixed point, its other end being connected to said other end of said lever.

4. A device as claimed in claim 2, wherein said elastically yielding device comprises a lever mounted to pivot about a fixed pivot pin, said lever being operatively connected to said output regulating means, a link pivotally connected to said movable element of said expansible chamber device, and to said lever, and a return spring disposed in alignment with said link and having one of its ends connected to said lever and its other end connected to a fixed point, whereby the movements of said movable element are at least roughly equal to the variations in the length of the spring.

5. A device as claimed in claim 3, wherein for the purpose of obtaining a carburated mixture whose air/gasoline ratio by weight is substantially constant at any engine load and speed, the link and return spring have such position relative to the lever that: firstly, the angle between the axis of the link and the radius of the lever intersecting the pivot pin of the lever and the pivotal connection of the link on said lever is between 120° and 150° when the engine is running in a warm condition at normal idling speed, secondly, the angle between the direction of traction of the return spring and the radius of the lever intersecting the point of attachment of the return spring on the lever is between 120° and 180° when the engine is stationary, and, thirdly, the angle corresponding to the total angular travel of the lever is less than 80°.

6. A device as claimed in claim 5, wherein, assuming C is the capacity of the engine in cubic centimetres, the diameter D of the throat of the conventional Venturi being equal to $$D=\sqrt{\frac{C}{8}}$$

the negative pressure inlet is located at a distance $l$ from the throttle controlling the entry of air, so that $l=1.15\ D$, and the diameter $d$ of the entrance of the inlet is such that $$d=\frac{D}{3.75}$$

the diameter $d_1$ of the jet is equal to $$\sqrt{\frac{C}{4500}}$$

and the total sectional area of the ports controlled by the thermostat is at the most equal to the sectional area of the passage through said jet.

7. A device as claimed in claim 1, wherein there is disposed between the output regulating means of the pump and the movable element of the expansible chamber device forming part of said device, for the purpose of insuring the connection, a rotary cam whose profile provides the predetermined law of variation in the output as a function of the negative pressure prevailing in the negative pressure inlet disposed in the induction pipe of the engine on the downstream side of the throat of the Venturi through which the air admitted into the engine passes.

8. A device as claimed in claim 7, wherein the cam is keyed on a journal, said device further comprising, also keyed on said journal, a lever to which are connected the movable element of the expansible chamber device and the elastically yieldable device adapted to balance at each instant the action of the negative pressure prevailing in said expansible chamber device.

9. A device as claimed in claim 7, wherein the pump also comprises regulating means regulating the output of said pump, and the cam acts on a roller carried by said regulating means.

10. A device as claimed in claim 7, wherein the profile of the cam is such that it has a regulating action for a negative pressure which is greater than that of idling speed and is obtained when acceleration is ceased, the engine rotating above the idling speed, so as to permit cutting off the injection of fuel at this time.

11. A device as claimed in claim 1, comprising an altimetric corrector whereby if the atmospheric pressure varies the air/gasoline ratio does not change.

12. A device as claimed in claim 11, wherein the corrector comprises an enclosure which has a volume which is large relative to a chamber of the expansible chamber device which communicates only and permanently with said enclosure, said enclosure being maintained under atmospheric pressure, corresponding at least roughly to the normal pressure at sea level, and comprising an aperture obturated by a movable member, a valve having a movable element connected to said movable member, an elastic return device connected to said movable element, said movable member being subjected to the opposite actions of the air pressure and of said elastic return device and controlling by its motion the connection to the atmosphere, on the one hand, of the chamber of the expansible chamber device containing negative pressure and, on the other hand, of the induction pipe of the engine on the downstream side of the negative pressure inlet.

13. A device as claimed in claim 11, wherein the enclosure is placed in the air circuit feeding the engine, whereby said corrector also performs the function of a thermometric correction.

References Cited by the Examiner
UNITED STATES PATENTS

| | | | |
|---|---|---|---|
| 2,132,445 | 10/38 | Schweizer | 123—140 |
| 2,182,933 | 12/39 | Schimanek | 123—140 |
| 2,447,268 | 8/48 | Evans | 123—140 |

RICHARD B. WILKINSON, *Primary Examiner.*